United States Patent
Lissotschenko et al.

(10) Patent No.: US 6,416,237 B2
(45) Date of Patent: *Jul. 9, 2002

(54) MICROSYSTEM MODULE

(76) Inventors: Vitaly Lissotschenko, Solbergweg 54, Dormund (DE), D-44225; Joachim Hentze, IM Welandsborn 15, Schlangen (DE), D-33189

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/091,038
(22) PCT Filed: Dec. 6, 1996
(86) PCT No.: PCT/EP96/05471
§ 371 (c)(1),
(2), (4) Date: Jun. 5, 1998
(87) PCT Pub. No.: WO97/21126
PCT Pub. Date: Jun. 12, 1997

(30) Foreign Application Priority Data

Dec. 7, 1995 (DE) .......................... 195 45 606
Mar. 20, 1996 (DE) .......................... 196 10 881

(51) Int. Cl.$^7$ .......................... G02B 6/36; G02B 6/42; G02B 7/02; G02B 7/18
(52) U.S. Cl. .......................... 385/88; 385/52; 385/147; 359/819; 359/831; 359/836
(58) Field of Search .......................... 385/88, 92, 147; 359/819, 831, 896

(56) References Cited

U.S. PATENT DOCUMENTS

| | | | | |
|---|---|---|---|---|
| 4,528,446 A | * | 7/1985 | Dunaway et al. | 250/216 |
| 4,767,172 A | * | 8/1988 | Nichols et al. | 355/1 |
| 5,424,531 A | * | 6/1995 | O'Regan et al. | 250/216 |
| 5,434,434 A | | 7/1995 | Kasahara et al. | |
| 5,515,253 A | * | 5/1996 | Sjobom | 362/244 |
| 5,537,503 A | * | 7/1996 | Tojo et al. | 385/93 |
| 5,644,431 A | * | 7/1997 | Magee | 359/619 |
| 5,666,446 A | * | 9/1997 | Kragl | 385/14 |
| 5,886,332 A | * | 3/1999 | Plesko | 235/472 |

FOREIGN PATENT DOCUMENTS

| | | | | |
|---|---|---|---|---|
| DE | 25 10 267 | | 9/1975 | |
| DE | 4034010 A | * | 5/1991 | 359/819 |
| EP | 0 117 606 | | 9/1984 | |
| FR | 2 536 546 | | 5/1984 | |
| FR | 2 541 466 | | 8/1984 | |

OTHER PUBLICATIONS

IBM Technical Disclosure Bullentin, vol. 22, No. 12, May 1980, New York US, pp. 5288–5290, XP002027926 W.B. Archey et al.: "Low Loss Optical Coupler".

(List continued on next page.)

Primary Examiner—Jon Henry
(74) Attorney, Agent, or Firm—Collard & Roe, P.C.

(57) ABSTRACT

The invention concerns a microsystem module, in particular for use in microoptical systems, the module consisting of a body on the surface of which at least one functional area and support areas for attachment to adjacent microsystem components are provided. According to the invention, in order to provide a microsystem module of this type which can be connected to adjacent microstructure system components with an extremely good fit and in an exactly reproducible manner and preventing damage to the adjacent components and the sensitive functional areas of the microsystem module, the support areas are disposed in the region of outwardly projecting surface regions of the body which are set back relative to the support areas in the direction towards the interior of the body. The functional areas are disposed with very narrow tolerances in a dimensionally accurate manner relative to the support areas.

9 Claims, 9 Drawing Sheets

OTHER PUBLICATIONS

Optics Letters, vol. 20, No. 6, Mar. 15, 1995, Washington, US, pp. 617–619, XP000493641 S.H. Song et al: "Planar Optical Configuration for Crossover Interconnects".

Patent Abstracts of Japan, vol. 4, No. 189 (E–39) [671] Dec. 25, 1980 & JP 55 132076 a (Nippondenshin Denwa Kosha), Oct. 14, 1980.

* cited by examiner

MICROSYSTEM MODULE

The invention relates to a microsystem module in particular for application in microoptical systems, consisting of a body, on the surface of which provision is made for at least one functional area and support areas for attachment to adjacent components of a microsystem.

Such microsystem modules are to be used primarily in micro-optics in order to connect light sources and light conductors with each other, or to shape the light beam at the end of a light conductor or on the outlet of a light source in a special way, for example to have it bundled, collimated, diffracted or diverged. Such microsystem modules, however, can be used also elsewhere in microstructure systems, where certain functional areas, for example scanning areas have to be fixed in an exact spatial relation to the adjacent components.

Such a problem in the field of microoptics is known, for example from WO 92/06046 A1. A microoptical lens described there consists of an oblong glass fiber, which is shaped flattened on three longitudinal sides and rounded in the form of a cylinder jacket on the fourth longitudinal side.

With said known microoptical lens, the area rounded in the form of a cylinder jacket serves as an optically effective boundary area, whereas the area disposed opposite the area rounded in the form of a cylinder jacket serves as a plane support area for connection to adjacent components, which are here designed in the form of diode lasers whose emitted light is to be collimated. The diode lasers are here glued to the support area of the microoptical lens with a suitable adhesive or optical cement. This poses the risk that the microoptical lens is not exactly positioned as required for its function relative to the diode lasers. Furthermore, the sensitive emitter area of the diode laser may be damaged during gluing or cementing.

The correct positioning of a microoptical lens relative to the emitter of a diode laser becomes substantially more difficult if the side of the microoptical lens facing the diode laser has a shape deviating from the plane as well. Such microoptical lenses, which are intended as collimators for diode lasers, are known, for example from U.S. Pat. No. 5,181,224. Said known collimators can be connected to a diode laser, for example only with considerable measuring expenditure and, if need be, with the help of adapters or fitted pieces. Of course, it is just as difficult to connect such microoptical lenses with an exact fit to adjacent microoptical components elsewhere. Finally, the risk with such microoptical lenses is that the optically effective boundary areas, which protrude in a convex form and which are very sensitive, are damaged during transport, handling and mounting of the microoptical lens.

Therefore, the problem of the invention is to create a microsystem module of the type specified above which can be connected to adjacent components of a microstructure system with an extremely exact fit and in an exactly reproducible manner, whereby damage to the adjacent components and the sensitive functional areas of the microsystem module is avoided.

The object of the invention is a microsystem module in particular for use in microoptical systems, consisting of a body on the surface of which at least one functional area and support areas for attachment to adjacent components of a microsystem are provided, whereby said microsystem module is characterized in that the support areas are arranged within the zone of the outwardly projecting surface areas of the body;

the functional areas are arranged in zones of the surface of the body which are set back relative to the support areas in the direction toward the interior of the body; and the functional areas are arranged with extremely narrow tolerances and with dimensional stability relative to the support areas.

With the microsystem module as defined by the invention, the sensitive functional areas project nowhere outwardly beyond the outer contour of the module, but are set back behind the support areas and accordingly well-protected against damage by touching. Furthermore, they do not come into contact with the adjacent components during mounting, so that damage to the adjacent components, for example damage to the sensitive emitter of diode lasers is reliably prevented,. Owing to the fact that the support areas are arranged with extremely narrow tolerances and dimensional stability relative to the functional areas already in the course of their manufacture, mounting of the module with dimensional stability is highly facilitated because for mounting, only the support areas have to be arranged on the module with the correct relation to the boundary surfaces of the adjacent components. If such relation in terms of dimension is correct, the arrangement of the functional area relative to the adjacent components is automatically correct as well, provided, of course, the countersupport areas of said components are arranged with dimensional stability as well.

According to a useful further development of the invention provision is made in the support areas for positively locking elements for engaging corresponding positively locking elements on the adjacent components. Such positively locking elements, for example in the form of deepenings and projections and/or grooves and springs make it possible to fix the microsystem module with exact adjustment in all directions without requiring costly measurements for the adjustment.

Furthermore, provision is made according to the invention. that the functional areas and/or the support areas are smoothly polished. Dimensional deviations caused by roughness of the surfaces are avoided by polishing said areas. The dimensional relations between such polished areas could be exactly fixed except for a few nanometers.

Provision is made according to a particularly preferred embodiment of the invention that the body consists of optically transparent material and that the functional areas are designed in the form of optically effective boundary areas, The term "optics" is understood in the following to include all systems operating with electromagnetic waves in the range of the visible and invisible (ultraviolet, infrared) light, up to the-microwaves (millimeter waves). Optically transparent material is understood to include materials such as optical glass, quartz, germanium, ruby, optical plastics etc., which are suitable for letting through and to influence electromagnetic waves of said type. The light is refracted on the optically effective boundary areas, reflected by total reflection or by a reflecting coating, and diffracted by diffraction lines or diffraction gratings. The functional areas present on the microsystem module suitable for microoptical systems can be designed in different ways. For example, they can be designed in the form of concave or convex lens surfaces, whereby all lens shapes known from the field of microoptics can be produced. Likewise, plane surfaces that are inclined versus each other can be arranged in the functional areas for forming prisms, which refract or reflect the light. Furthermore, diffraction lines or diffraction gratings can be arranged in the functional area, which diffract the light passing through. Finally, the functional areas can be wholly or partly coated with a reflecting coating.

It is possible also, if need be, to arrange in each functional area a great number of functional elements in the form of lenses and/or prisms and/or diffraction lines and/or reflecting surfaces. So-called lens arrays can be produced in this way on one single microoptical module.

Special advantages are obtained if functional areas are arranged on the body on sides opposing each other diametrally, with the functional elements of said functional areas being optically correlated through the body. It is possible in this way to install on such a microoptical module optical systems which shape and further transmit the light passing through in all sorts of different ways.

A microoptical module designed according to the instruction of the invention can be designed, for example in the form of a refractive collimator that is connectable to a diode laser. With such a collimator, the functional area facing the emitter of the diode laser forms a prism whose apex extends parallel with the longitudinal expanse of the emitter of the diode laser, and which is rounded off within the near proximity of the emitter. Furthermore, the apex angle of the prism is greater than the angle of emission orthogonally relative to the longitudinal expanse of the emitter of the diode laser. Finally, the functional area disposed opposite the emitter of the diode laser is designed in the form of a cylindrical surface whose cylinder axis extends orthogonally relative to the apex of the prism. Such a refractive collimator is capable of receiving and collimating the band of light emitted by the emitter of the diode laser with very low losses. Said collimator has a particularly high numerical aperture of, for example 0.68 when quartz glass is used, and can consequently almost completely collimate the light emitted by the diode laser. Said refractive collimator, too, advantageously has support areas projecting beyond the functional areas. The special design and the association of the functional areas relative to one another, however, offers the stated advantages also without the support areas. Therefore, the scope of protection of the patent is to relate also to collimators of the last-mentioned type, where the support areas specified in patent claim 1 are missing.

Another microoptical module designed according to the instruction of the invention may be designed, for example in the form of a reflective optical coupler, which is insertable between a diode laser and a light wave conductor following the latter. Two functional elements are arranged on each of the functional areas of the optical coupler, namely a first aspherical cylinder lens and displaced relative to the latter a plane mirror on the first functional area, and a second aspherical cylinder lens on the second functional area. The cylinder axes of the two cylinder lenses extend orthogonally relative to each other. Their optical axes, on the other hand, are arranged parallel with one another. The emitter of the diode laser is arranged in front of the first aspherical cylinder lens. A light band emitted by the emitter falls through the first cylinder lens into the microsystem module, hits the oppositely arranged aspherical cylinder mirror, is deflected from there onto the plane mirror, and then exits from the microsystem module through the second aspherical cylinder lens. Such a reflective optical coupler has an extremely short structural length and is capable of receiving the band of light emitted by the emitter of the diode laser with very low losses and of coupling it focused into a light wave conductor. Said reflective optical coupler advantageously has support areas projecting beyond the functional areas. However, the special design and mutual association of the functional areas offers the stated advantages also without said support areas. Therefore, the scope of protection of the patent is to cover also reflective optical couplers of the last-mentioned type, where the support areas specified in patent claim 1 are missing.

Another microsystem module designed according to the instruction of the invention may be designed, for example in the form of an optical printed circuit board, by which at least two optoelectronic semiconductor modules can be connected to each other. For said purpose, the functional areas are designed in the form of lenses for coupling light rays in and out, on the one hand, and as mirrors for guiding the light rays within the optical conductor board, on the other. Such an optical conductor board is capable of receiving a light beam emitted by an optoelectronic semiconductor module (IOE chip) connected to the input side via a first lens and to guide the course of the light beam within the optical conductor board by means of the mirrors in such a way that the light beam exits from the optical conductor board via a second lens and hits a second optoelectronic semiconductor module connected to the output side. The two optoelectronic semiconductor modules are optically inter-connected with each other in this way for the purpose of data exchange. By using suitably designed wave-selective beam switches it is possible to connect a plurality of opto-electronic semiconductor modules bidirectionally with each other. By using a great number of lenses and mirrors in the optical conductor boards it is possible also to realize more complicated three-dimensional optical connection structures. Said optical conductor board advantageously has support areas projecting beyond the functional areas. However, the special design and mutual association of the functional areas offer the stated advantages also without said support areas. The scope of protection of the patent therefore is to cover also optical conductor boards of the last-mentioned type, where the support areas specified in patent claim 1 are missing.

A microoptical module designed according to the instruction of the invention as well may be connected, for example in the form of a wave-selective beam switch to a light source, a light receiver and a light wave conductor. For this purpose, the functional area facing the light source and the light wave conductor has a functional element with wave-selective properties, which provide the functional element with a reflective or a refractive behavior depending on the wavelength of the inciding light rays. A beam of light originating from the light source is reflected by the wave-selective functional element in such a way that it hits the light wave conductor. A beam of light exiting from the light wave conductor is refracted by the same wave-selective functional element in such a way that it hits the light receiver. Such a wave-selective beam switch permits bidirectional optical data transmission via a light wave conductor. A diode laser is normally used as the light source, whose focused band of light is coupled into the light wave conductor via the wave-selective functional element of the beam switch and a spherical lens. The light rays exiting from the light wave conductor are refracted on the wave-selective functional element, run through the beam switch, exit from the latter on the opposite side, and hit the light receiver, for example a photodiode. Said wave-selective beam switch advantageously has support areas projecting beyond the functional areas. The special design and mutual association of the functional areas, however, offer the stated advantages also without said support areas. Therefore, the scope of protection of the patent is to cover also wave-selective beam switches of the last-mentioned type, where the support areas specified in patent claim 1 are missing.

Furthermore, the object of the invention is a process for producing microsystem modules of the type specified above, whereby said process is characterized in that the support areas and the deepenings with the surface contours of the functional areas associated with said support areas are produced on a substrate by ultrasound oscillation lapping with a correspondingly shaped single-part lapping mold.

With the process proposed according to the invention, the microstructures to be produced on the substrate, namely the support areas and the deepenings with the surface contours of the functional areas can be produced with high dimensional accuracy. In said process, a lapping mold made from hard metal and mechanically oscillating at ultrasound frequency and having a negative imprint of the microstructure to be produced, is pressed against the substrate with the use of a sufficiently hard lapping agent (hard substance-powder or paste), thereby forming on the surface of the substrate a positive print of the lapping mold with high dimensional accuracy and relatively low surface roughness. Due to the fact that a single-part lapping mold is used it is possible in a simple manner to maintain the dimensional relation between the support areas and the functional areas with the highest possible accuracy.

The surface roughnesses are so low that they can be polished without problems with an electron beam. The energy density of the electron beam is adjusted in this connection in such a way that only the surface of the area to be polished is slightly melted, so that the surface tension produces an absolutely smooth surface. Such polishing with an electron beam is the object of a German patent application DE 42 34 740 A1 by the same applicant.

For the mass production of microsystem modules of the type explained above, the invention proposes that the negative contours of a great number of microsystem modules are formed on a lapping mold with a large surface area; that the lapping mold is reproduced on a substrate having a correspondingly large size; and that the substrate is subsequently divided in the individual microsystem modules.

An exemplified embodiment of the invention is explained in greater detail in the following with the help of the drawings, in which:

FIG. 6 is a side view of a microsystem module designed in the form of a reflective optical coupler.

Corresponding reference symbols are used in the following description of the drawings for identical components.

Figure 1:
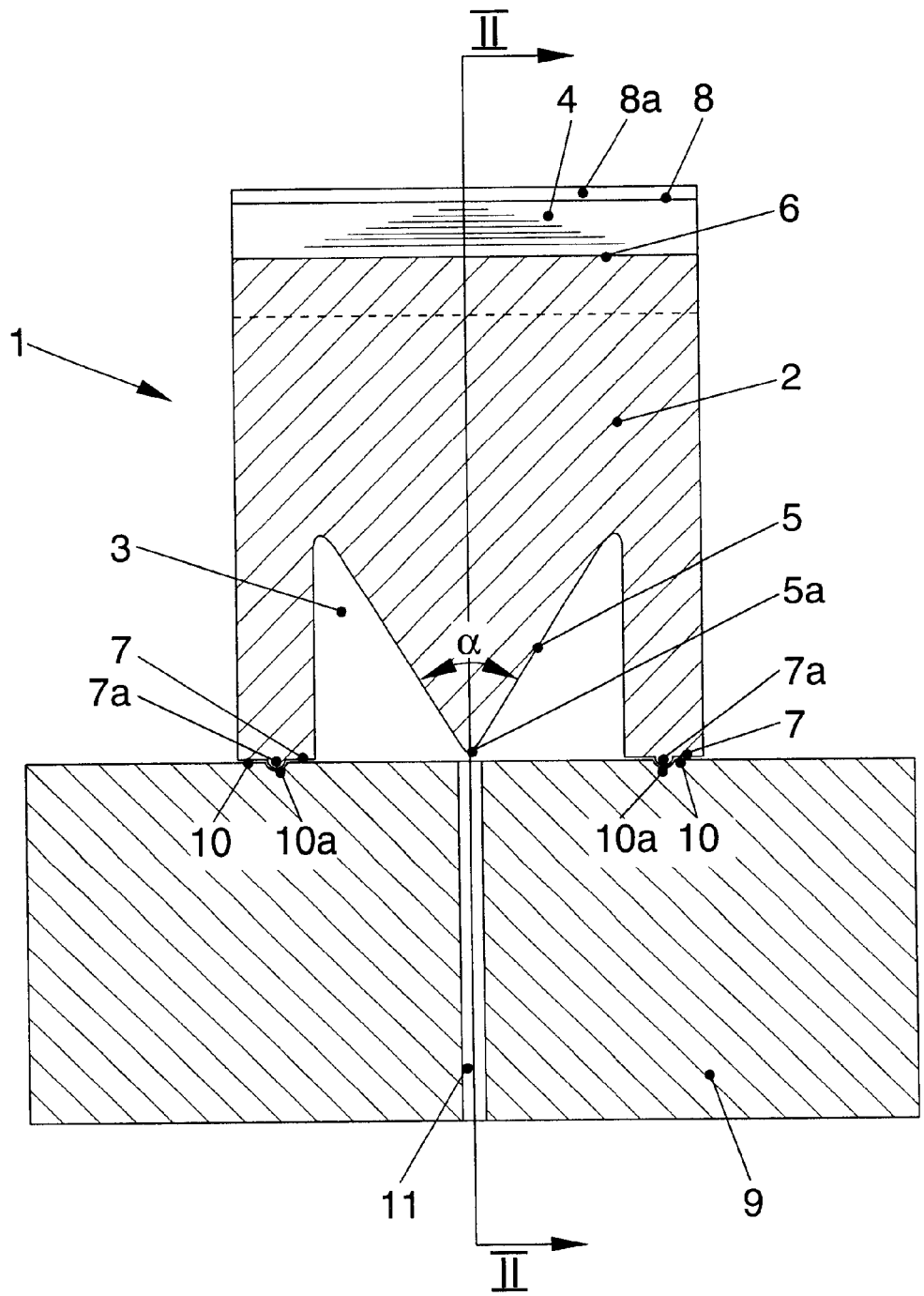
FIG. 1 shows a vertical longitudinal section through a microsystem module signed in the form of a refractive collimator, w a diode laser connected thereto.

In FIG. 1, a microsystem module as defined by the invention for use in microoptical systems is denoted in its entirety by reference numeral 1. Microsystem module 1 is designed as a refractive collimator. It consists of a body 2, for example made from quartz glass or another optically transparent material. Deepenings 3 and 4 are worked into body 2,. with functional areas 5 and 6 being arranged on their bottoms. Functional area 5 has the shape of a prism with an apex angle alpha=85°. Within the region of its apex the prism is provided with a rounding 5a. Functional area 6 has an approximately cylinder jacket-shaped curvature, whereby the axis of said cylinder jacket-shaped curvature extends perpendicular to the longitudinal expanse of the apex of the prism on the opposite, optically effective boundary area 5.

Furthermore, body 2 is provided with support areas 7 and 8 serving for the connection to adjacent optical components 9, for example for the connection to a diode laser, which is provided with countersupport areas 10 corresponding with support areas 7. Support areas 7 and 8 are provided with positively locking elements 7a and, respectively, 8a, for example in the form of projections, the latter protruding from the area and engaging corresponding positively locking counter elements 10a in the counter-support areas 10 on the adjacent optical components 9.

Figure 2:
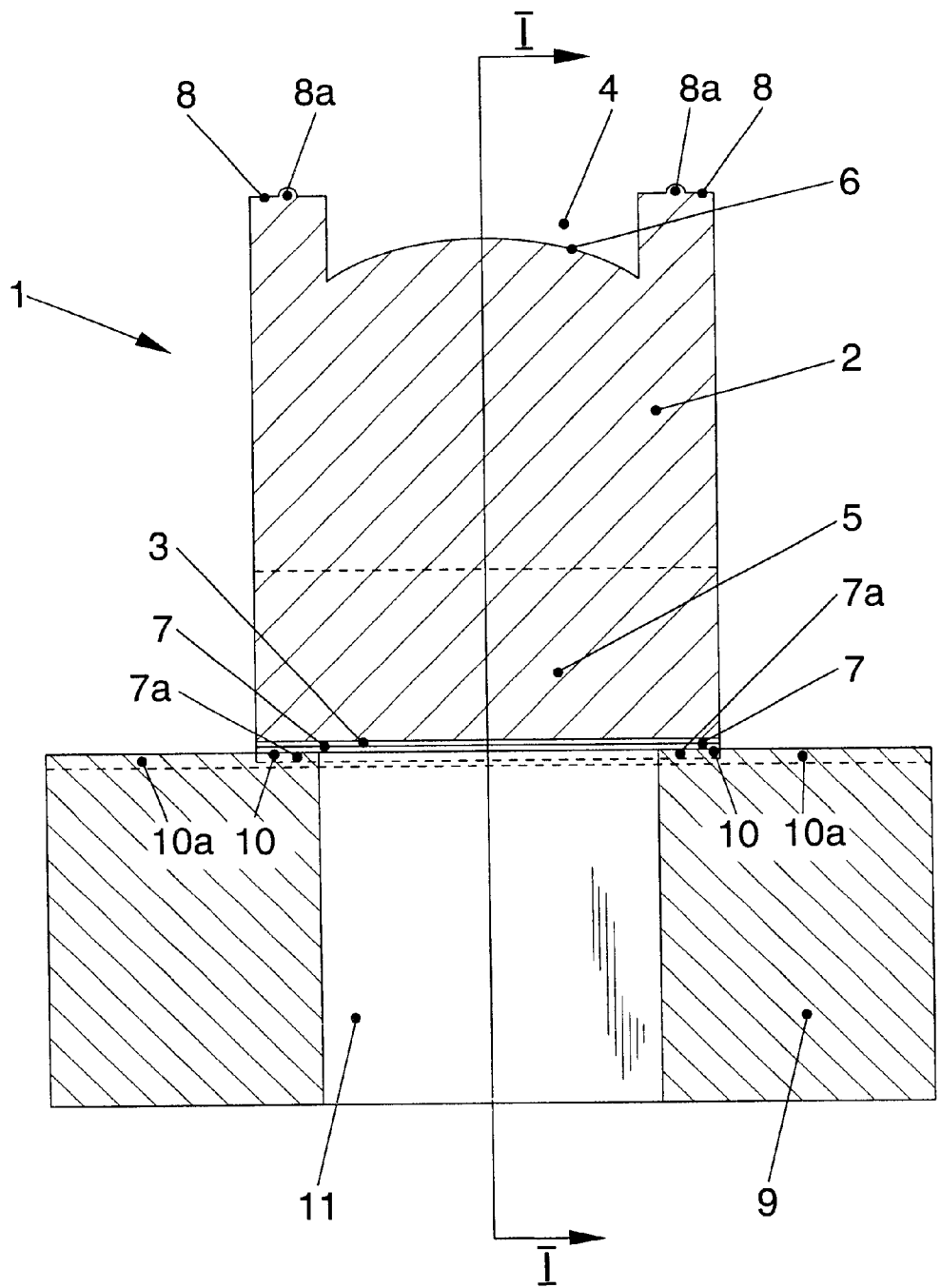
FIG. 2 shows a horizontal longitudinal section through the microsystem module according to FIG. 1.

FIGS. 1 and 2 show that support areas 7 and 8 are disposed in an exactly defined dimensional relation to functional areas 5 and 6. Owing to the fact that functional areas 5 and 6 are set back relative to support areas 7 and 8 in the direction of the interior of body 2, they are arranged in a well-protected way. With the help of support areas 7 and 8 on body 2 and countersupport areas 10 on the abutting optical component 9, microsystem module 1 can be positioned in a simple way on diode laser 11 with high accuracy, namely in a way such that the apex of the prism in functional area 5 is disposed exactly opposite the emitter of diode laser 11 and at the same time aligned exactly parallel with the longitudinal expanse of said laser.

Figure 3:
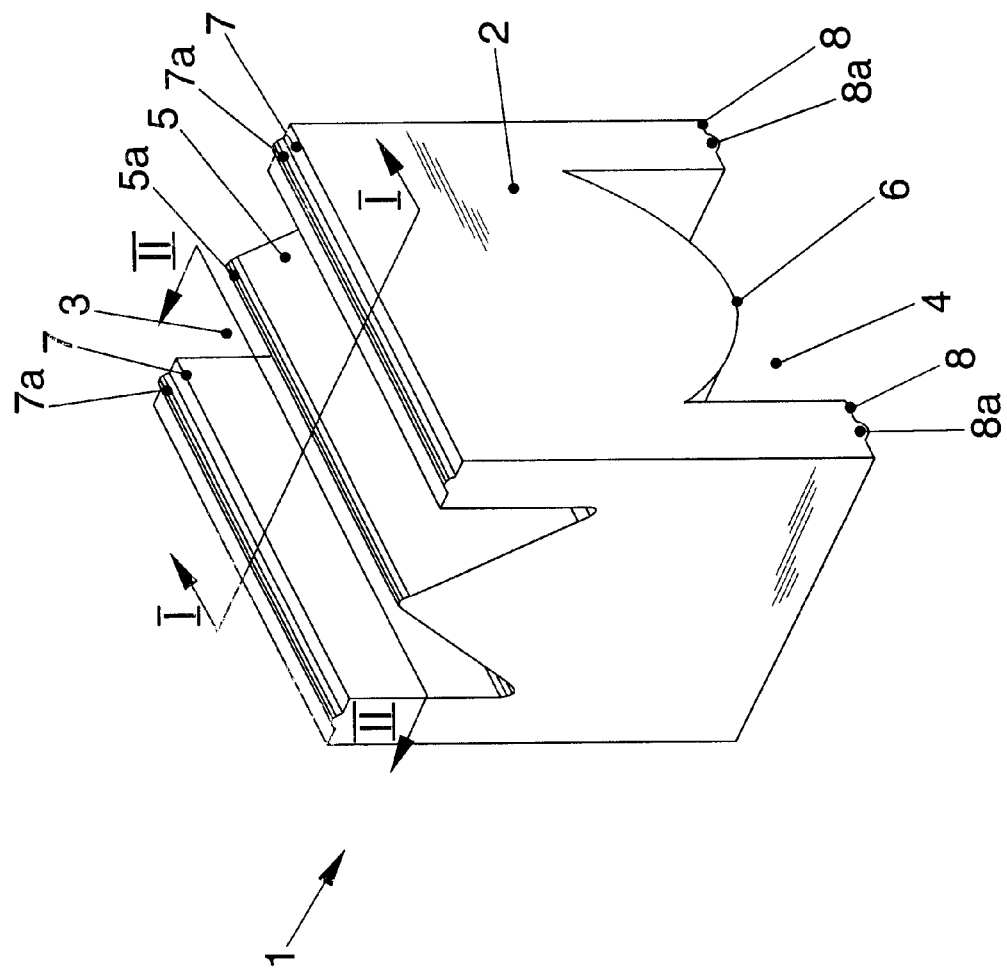
FIG. 3 is a perspective representation of the microsystem module according to 1 and 2.

The above-described microsystem module 1 is perspectively shown in FIG. 3.

Figure 4:
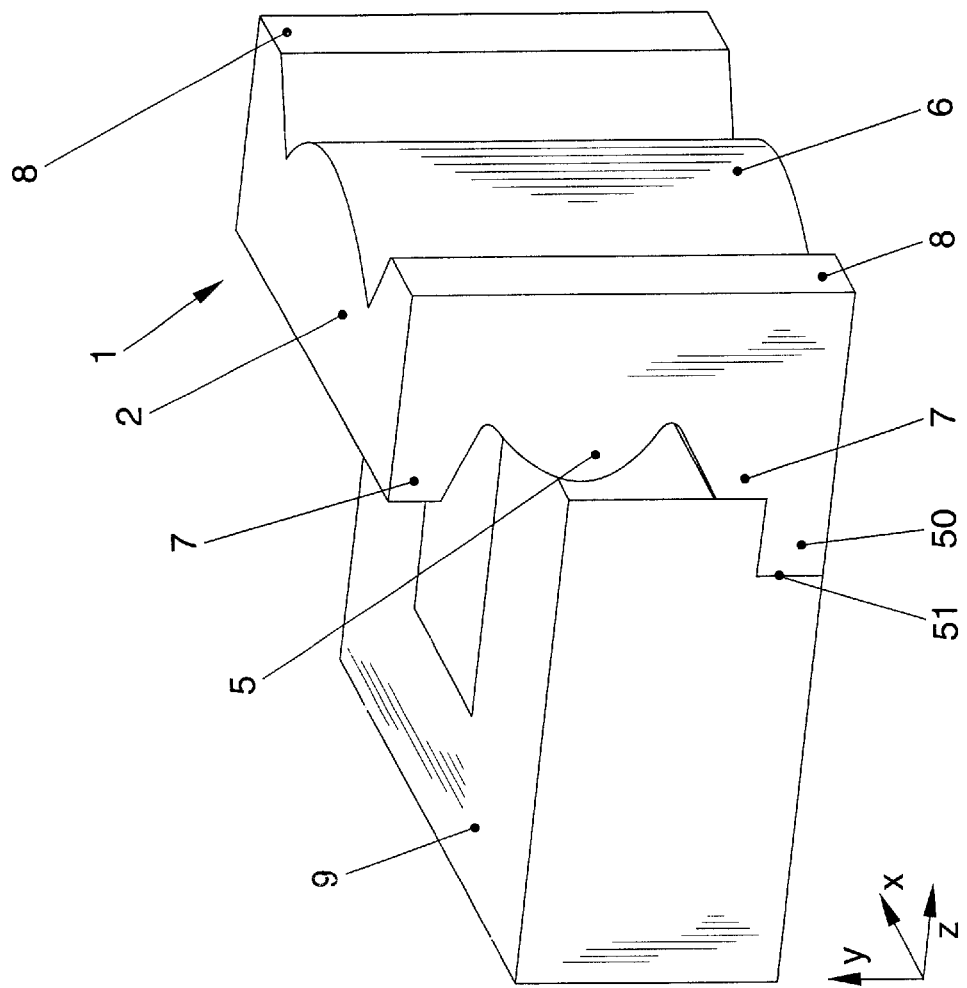
FIG. 4 is a perspective representation of a microsystem module with positive locking elements in the support areas for engaging corresponding positively locking elements on adjacent components.

FIG. 4 shows a microsystem module 1 designed in the form of a refractive collimator whose support areas 7, which border on an optical component 9, are provided with projections 50. Said projections 50 engage corresponding deepenings 51 on the adjacent component 9. This permits fixing of microsystem module 1 on adjacent component 9 with exact adjustment in the Y- and z-directions without requiring costly measurements for such adjustment.

Figure 5:
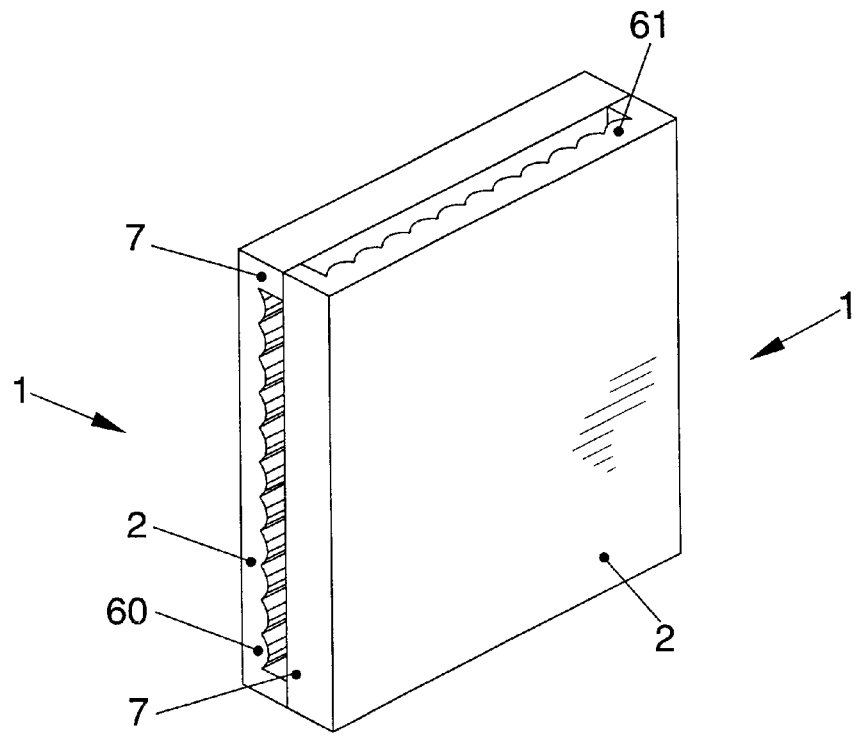
FIG. 5 is a perspective representation of two cylinder lens arrays arranged one after the other.

FIG. 5 shows two microsystem modules 1 each having a great number of functional elements in the form of cylinder lenses arranged on their functional areas. The two microsystem modules 1 each form a cylinder lens array 60 and 61. The cylinder axes of cylinder lens arrays 60 and 61 extend parallel with each other. On their support areas 7, the two cylinder lens arrays 60 and 61 border on each other with functional areas facing each other. The cylinder axes of the two cylinder lens arrays 60 and 61 extend at a right angle relative to each other. Such cylinder lens arrays 60 and 61 are frequently arranged one after the other in order to obtain in this way optimal transformation and shaping of a bundle of light rays passing through such arrays.

Figure 6:
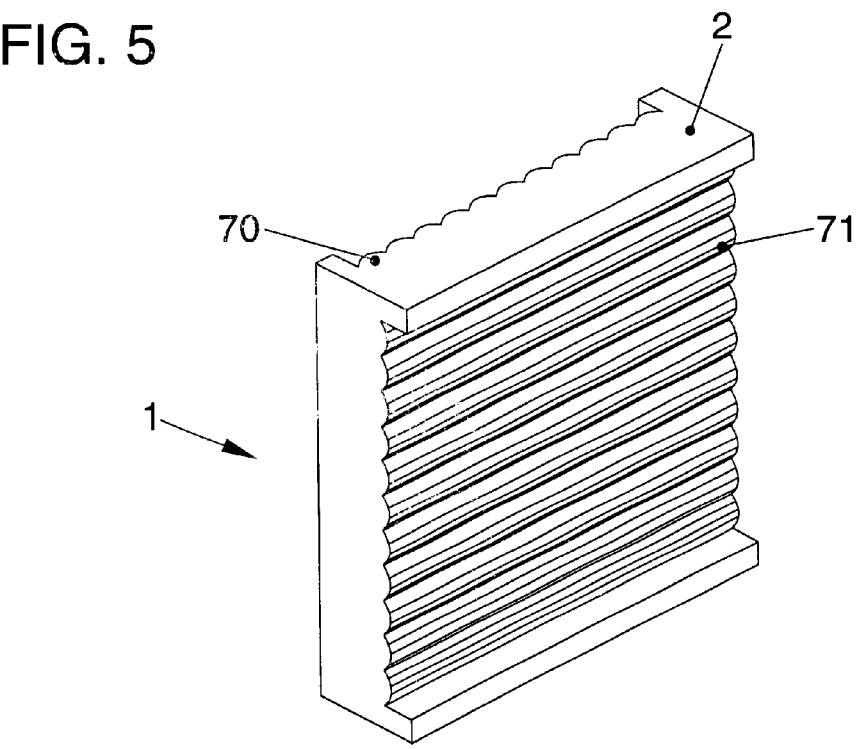
FIG. 6 is a perspective representation of a microsystem module with optically correlated functional areas opposing each other diametrally.

FIG. 6 shows a microsystem module 1 having cylinder lens arrays 70 and 71, respectively, arranged on its body 2 on diametrally opposed sides, said arrays being optically correlated through body 2. The cylinder axes of the two cylinder lens arrays 70 and 71 extend at a right angle relative to each other.

Figure 7:
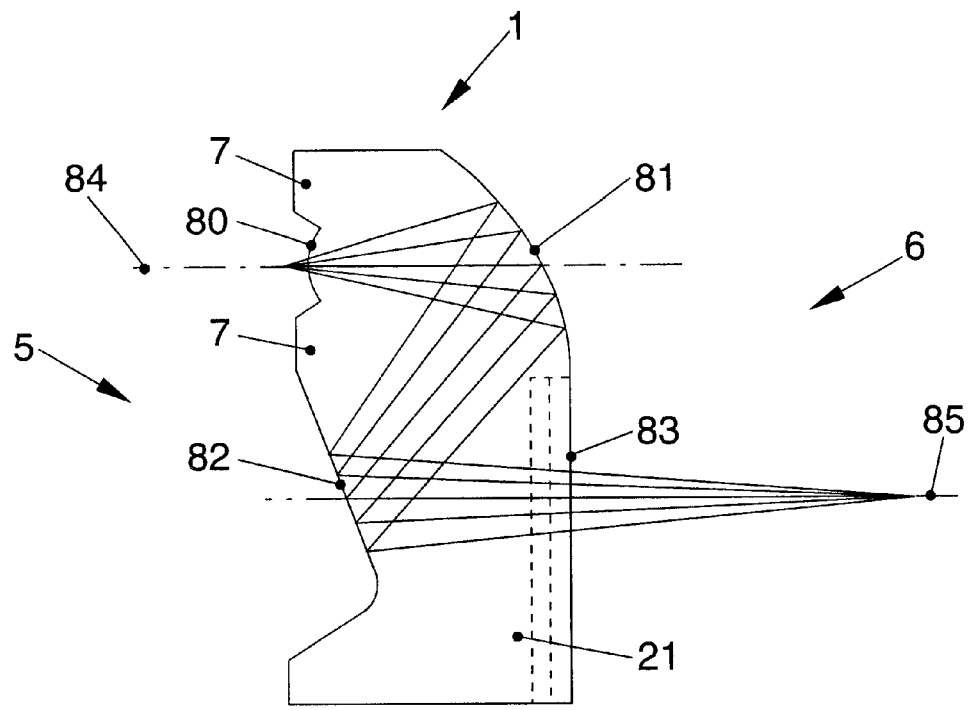
Figure 8:
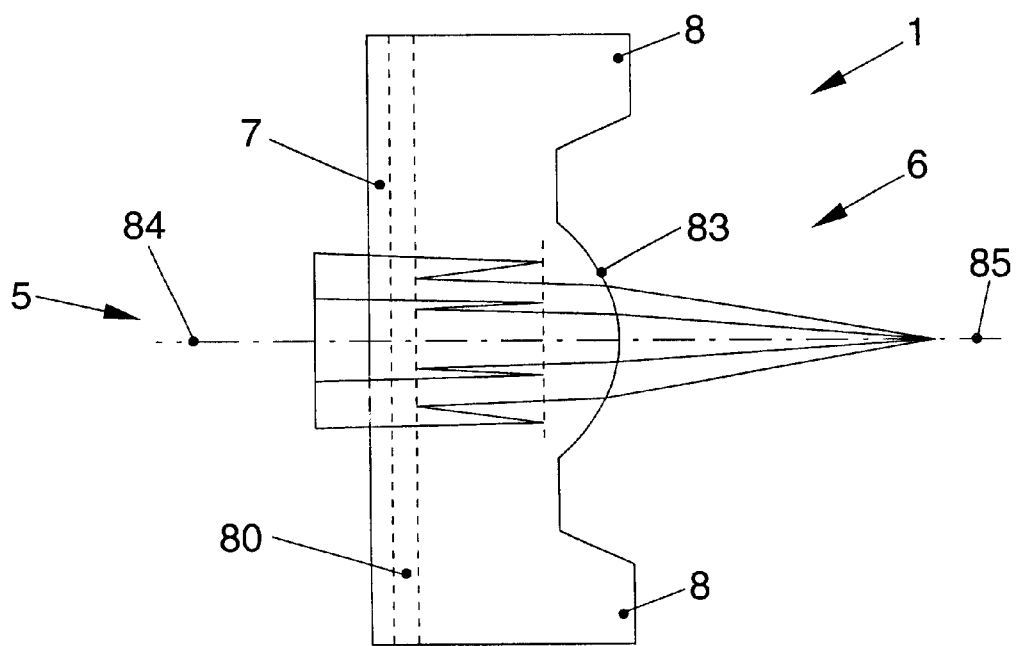
FIG. 8 is a top view of the microsystem module according to FIG. 7.

FIG. 7 shows a microsystem module 1 designed in the form of a reflective optical coupler. Functional areas 5 and 6 are arranged on its body 2 on diametrally opposed sides and the functional elements 80 to 83 of said functional areas are optically correlated through body 2. The emitter of a diode laser (not shown) is arranged in front of an aspherical cylinder lens 80, said emitter emitting a band of light. Said band of light enters into body 2 through a cylinder lens 80, hits an aspherical cylinder mirror 81, and is reflected from said mirror onto a plane mirror 82 and from there onto a second aspherical cylinder lens 83. The band of light then exits through cylinder lens 83 from body 2 and is finally coupled into a light wave conductor (also not shown), the latter being arranged in front of cylinder lens 83. The cylinder axes of the two cylinder lenses 80 and 83 extend orthogonally and their optical axes 84 and 85 extend parallel with each other. Such a reflective optical coupler serves for focusing the band of light emitted by the diode laser and for coupling such light into the light wave conductor. FIG. 8 is a top view of the reflective optical coupler shown in FIG. 7.

Figure 9:
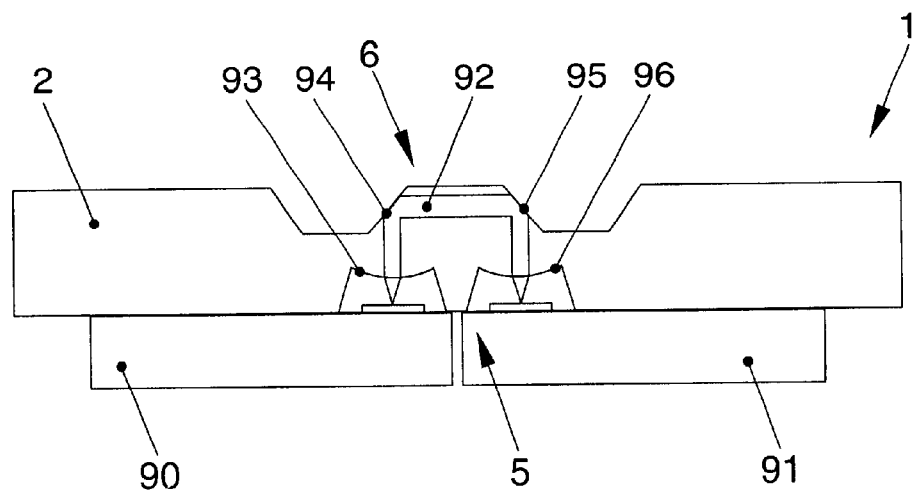
FIG. 9 is a longitudinal section through a microsystem module designed in the form of an optical conductor board.

FIG. 9 shows a microsystem module 1 designed in the form of an optical conductor board, which is connected to two optoelectronic semiconductor modules 90 and 91 and optically connected said modules with each other. The functional areas of the optical conductor board are designed in the form of lenses 93 and 96 for coupling light rays in and out, on the one hand, and in the form of mirrors 94 and 95 for guiding the beam within the optical conductor board, on the other. The optical interconnections are realized as follows: the first optoelectronic semiconductor module 90 emits a light a beam 92, which is coupled into body 2 of the optical conductor board via a first lens 93. Light beam 92 is guided via mirrors 94 and 95 in such a way that it is coupled out of body 2 again via a second lens 96 and hits the second optoelectronic semiconductor module 91. Connecting the two optoelectronic semiconductor modules 90 and 91 in the reserve direction is possible as well; i.e., semiconductor module 91 emits a light beam 92, which is then received by semiconductor module 90. By using suitable beam switches is it possible to realize a bidirectional interconnection of the two optoelectronic semiconductor modules 90 and 91.

Figure 10:
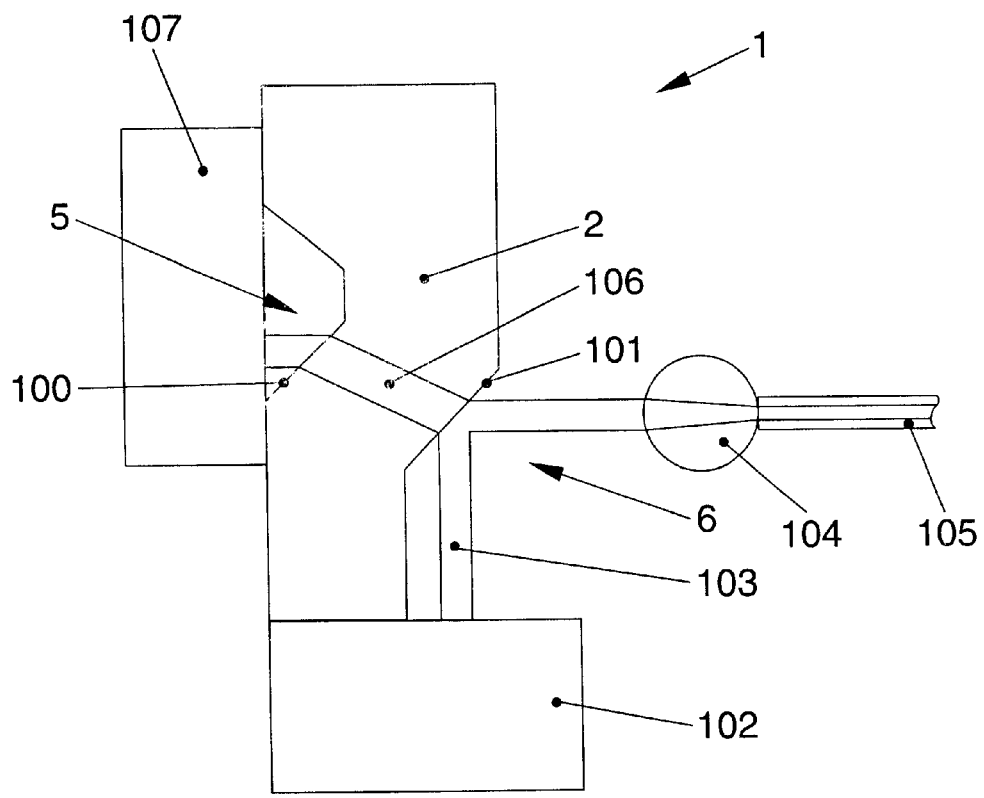
FIG. 10 shows a longitudinal section through a microsystem module designed in the form of a wave-selective beam switch.

FIG. 10 shows a microsystem module 1 designed in the form of a wave-selective beam switch. Said microsystem module is connected to a light source 102, a light receiver 107 and a light wave conductor 105. Functional area 6 facing light source 102 and light wave conductor 105 has a functional element 101 with a wave-selective behavior. A diode laser is used as light source 102. The emitter of diode laser 102 emits a light band 103, which is reflected on the wave-selective functional element 101 and coupled into light wave conductor 105 via a spherical lens 104. Now, if a light beam 106 is coupled out of light wave conductor 105, said light beam is refracted on wave-selective functional element 101 and on an oppositely disposed functional element 100 in such a way that it hits light receiver 107. The latter is designed in the form of a photodiode. Such a wave-selective beam switch permits bidirectional optical data transmission via a light wave conductor 105.

Figure 11:
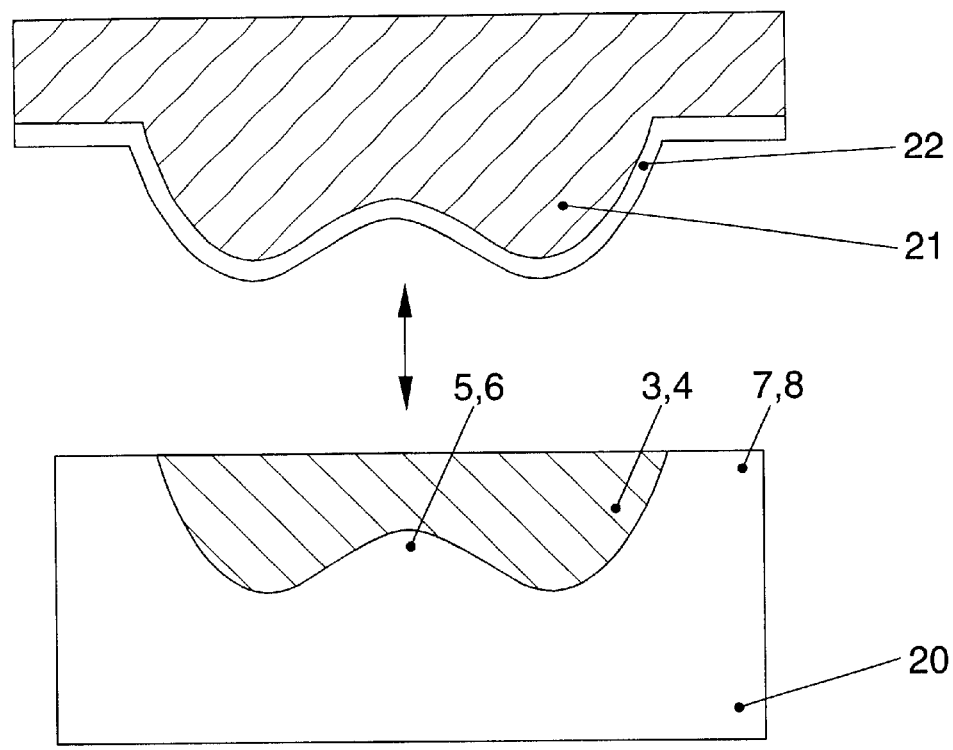
FIG. 11 shows by a schematic sectional view the lapping process for producing a crude molding of a microsystem module from a substrate.
Figure 12:
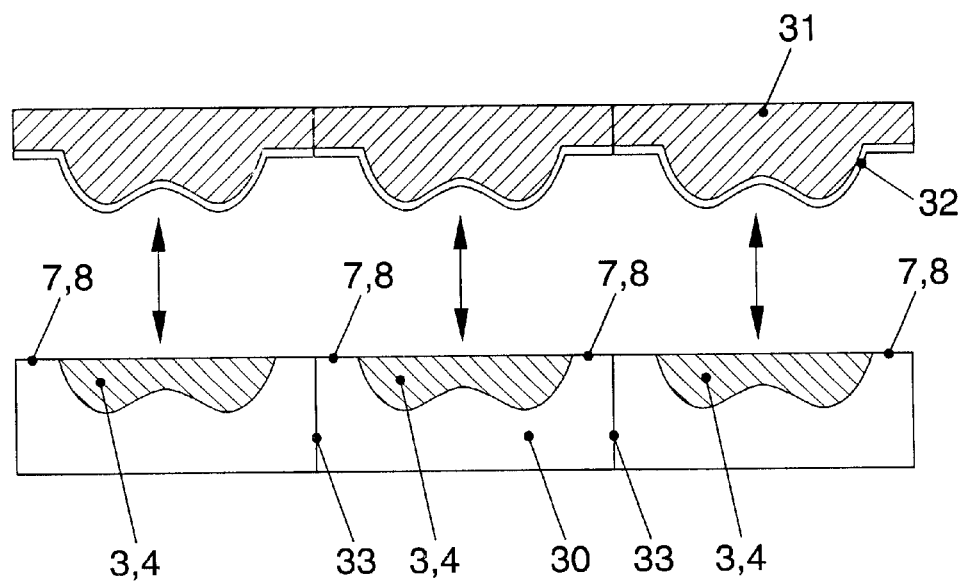
FIG. 12 shows by a schematic sectional view the lapping process for producing a crude molding of a plurality of functional elements from a substrate, such elements being arranged next to each other on the optically effective boundary areas.
Figure 13:
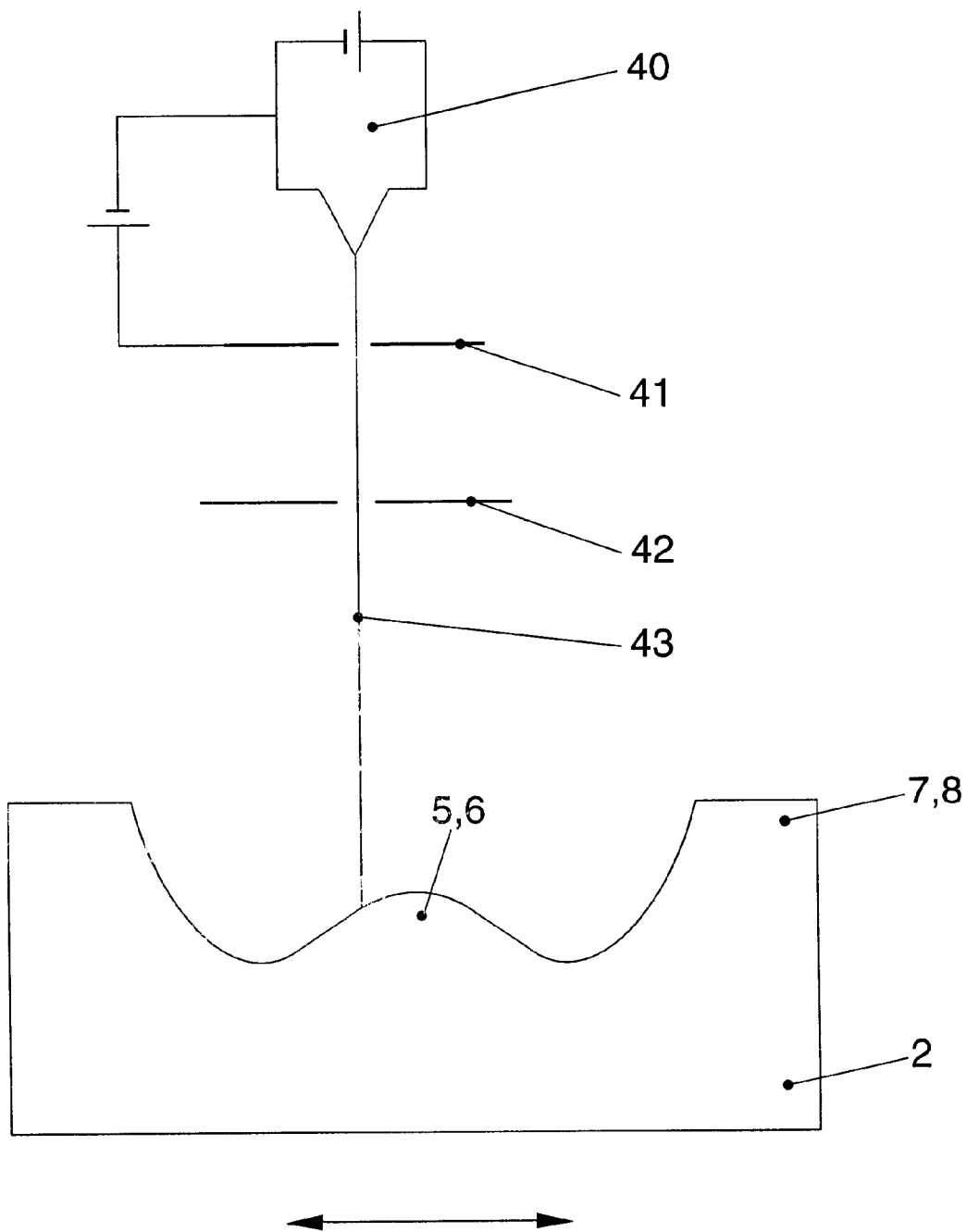
FIG. 13 shows by schematic sectional view the polishing of the optically effective boundary areas by means of an electron beam.

The production process for manufacturing microsystem modules 1 as defined by the invention is schematically shown in FIGS. 11 to 13. The first step of the manufacturing process is based on a, for example ashlar-shaped substrate 20 made from optically transparent material, for example quartz glass. Deepenings 3 and 4 in the ashlar-shaped quartz glass body are produced by ultrasound vibration lapping. This involves undirectional cutting with loose hard-substance grains finely distributed in a liquid or paste, such grains being activated by a lapping mold made from hard metal and vibrating at ultrasound frequency.

The ultrasound vibration lapping for producing a crude shape of an individual microsystem module 1 is schematically shown in FIG. 11. The lapping mold is denoted by reference numeral 21. On its surface facing the substrate 20 it has a negative imprint of deepenings 3 and 4 and functional areas 5 and 6 to be produced. On the side facing substrate 20, lapping mold 21 is coated with a coating 22 consisting of abrasive. Preferably, such abrasive is a grinding powder containing grains of a hard material in a finely distributed form.

For the lapping process, lapping mold 21 provided with abrasive coating 22 is stimulated with mechanical vibrations in the ultrasound range and pressed against substrate 20, so that the material of substrate 20 is removed by undirectional cutting. As soon as lapping mold 21 comes into contact with area regions 7, 8 of substrate 20, the cutting process is stopped. As the result, an exactly positive copy of lapping mold 21 is formed on substrate 20. It is possible in this way to produce the required structures on the surface of microsystem module 1 to be produced with high dimensional accuracy.

FIG. 12 shows the manufacture of a plurality of functional elements by means of the ultra sound lapping vibration lapping process, the elements being arranged next to each other on a substrate with a large surface area. On its surface facing a substrate 30 with a large surface area, a lapping mold 31 with a large surface area is provided with a negative copy of a plurality of deepenings and optically effective boundary areas disposed next to one another. On the side facing substrate 30, the lapping mold is coated with a layer 32 consisting of abrasive. As explained for the manufacture of a single microsystem module, the material of substrate 30 is now removed by undirectional cutting with mechanical vibrations in the ultrasound range vertically directed at the substrate. So-called lens arrays can be produced in this way on one single microoptical module or the individual functional elements can be divided after their manufacture along lines 33 in individual microsystem modules 1.

Functional areas 5 and 6 are finally polished in a second process step with a high-energy electron beam 43. Said step is shown in FIG. 13. The electron gun shown there for generating a high-energy electron beam 43 has a cathode 40 serving as electron source, an anode 41 serving for accelerating electron beam 43, and a slotted shutter 42 for shaping electron beam 43. The very high-energy electron beam 43 so produced, which has the shape of a flat rectangular band, is directed at the surfaces on substrate 2 to be polished. Substrate 2 is then moved transversely to the plane of the band-shaped electron beam 43. The feed of energy into the surface to be polished is controlled in this connection by suitable measures in such a way that only the surface is slightly melted over the depth of the roughnesses present, namely in each case to such an extent that the roughness present is compensated by the surface tensions of the melt.

What is claimed is:
1. A microsystem module for a microoptical system, comprising an optically transparent body having
   (a) at least one first support area and at least one second support area arranged in respective outwardly projecting portions of said body, each of said support areas having a positively locking element for engaging a corresponding locking element on an adjacent component of the microoptical system, each positively locking element of said at least one first support area extending in a perpendicular longitudinal direction to each positively locking element of said at least one second support area to provide a positive locking function; and (b) at least one functional area comprising a concave or convex lens formed in a surface of said body interior of said first and second support areas and arranged with very narrow tolerances and dimensional accuracy relative to the support areas to form an optically effective boundary area.

2. The microsystem module according to claim 1 wherein said at least one functional area and/or the support areas are smoothly polished.

3. The microsystem module according to claim 1 wherein there are at least two functional areas which are arranged on the body on diametrically opposed sides, with the functional elements of said areas being optically correlated through the body.

4. The microsystem module according to claim 3, wherein said microsystem module is designed in the form of a reflective optical coupler insertable between a diode laser and a light wave conductor adjoining said laser;

two functional elements are arranged on each of the at least two functional areas, a first functional area of said at least two functional areas comprising a first aspherical cylinder lens and a plane mirror displaced relative to said first aspherical cylinder lens, and a second functional area of said at least two functional areas comprising an aspherical cylinder mirror and a second aspherical cylinder lens displaced relative to said aspherical cylinder mirror;

the cylinder axes of the two cylinder lenses extend orthogonally relative to each other; and the optical axes of the two cylinder lenses are arranged parallel with each other.

5. The microsystem module according to claim 3, wherein said microsystem module is designed in the form of an optical conductor board, by which at least two optoelectronic semiconductor modules are connectable to each other; and the at least two functional areas comprise lenses for coupling light rays in and out, and mirrors for guiding the beam within the optical conductor board.

6. The microsystem module according to claim 3, wherein said microsystem module is designed in the form of a wave-sensitive beam switch connectable to a light source, a light receiver and a light wave conductor; and the functional area facing the light source and the light wave conductor has a functional element with wave-sensitive properties.

7. A process for producing a microsystem module for a microoptical system comprising an optically transparent body having (a) at least one first support area and at least one second support area arranged in respective outwardly projecting portions of said body, each of said support areas having a positively locking element for engaging a corresponding locking element on an adjacent component of the microoptical system, each positively locking element of said at least one first support area extending in a perpendicular longitudinal direction to each positively locking element of said at least one second support area to provide a positive locking function; and (b) at least one functional area comprising a concave or convex lens formed in a surface of said body interior of said first and second support areas and arranged with very narrow tolerances and dimensional accuracy relative to the support areas to form an optically effective boundary area;

said process comprising the steps of:

providing a substrate comprising an optically transparent material;

providing a single-part lapping mold having a contour corresponding to a contour to be produced on said substrate; and producing by ultrasound vibration lapping on said substrate said at least one functional area in the surface of said substrate interior of said first and second support areas using the lapping mold.

8. The process according to claim 7, wherein the lapping mold comprises a negative contour of a plurality of microsystem modules wherein the lapping mold has a large surface area modeled on a substrate with a correspondingly large surface area; and wherein the process further comprises dividing the substrate into individual microsystem modules after producing said at least one functional area on said substrate.

9. The process according to claim 7, further comprising the step of polishing the functional areas and the support areas with an electron beam after producing said at least one functional area on said substrate.

* * * * *